United States Patent [19]

Valente

[11] Patent Number: 4,531,439
[45] Date of Patent: Jul. 30, 1985

[54] METAL WORKING APPARATUS

[75] Inventor: Raymond L. Valente, 535 S. May St., Kankakee, Ill. 60901

[73] Assignee: Raymond L. Valente, Kankakee, Ill.

[21] Appl. No.: 504,882

[22] Filed: Jun. 16, 1983

[51] Int. Cl.³ ..................... B23D 17/06; B26D 11/00
[52] U.S. Cl. ....................................... 83/200; 29/560; 72/324; 83/518; 83/599
[58] Field of Search ............................. 29/560, 560.1; 72/332, 324, 389, 464; 83/598, 599, 200, 634, 199, 603, 518, 633, 552, 564

[56]     References Cited
       U.S. PATENT DOCUMENTS

| | | | |
|---|---|---|---|
| 1,035,096 | 8/1912 | Kraut | 83/603 X |
| 3,701,276 | 10/1972 | Malmgren | 83/599 X |
| 3,866,522 | 2/1975 | Oswald, Jr. | 83/599 X |

Primary Examiner—Z. R. Bilinsky
Attorney, Agent, or Firm—Trexler, Bushnell & Wolters, Ltd.

[57]     ABSTRACT

A metal working apparatus comprises a fixed frame and first and second metal working tools operatively mounted to the frame. A tool mounting structure is movable alternatively in one of a first direction for operating the first tool and a second direction for operating the second tool. A bi-directional drive means is carried upon the frame for driving the mounting structure in the first and second direction.

Operator accessible first and second controls are provided for respectively controlling the direction of operation of the drive means so as to drive the mounting structure respectively in the first and second directions. The controls are preferably located respectively at first and second work stations on opposite sides of the fixed frame.

14 Claims, 7 Drawing Figures

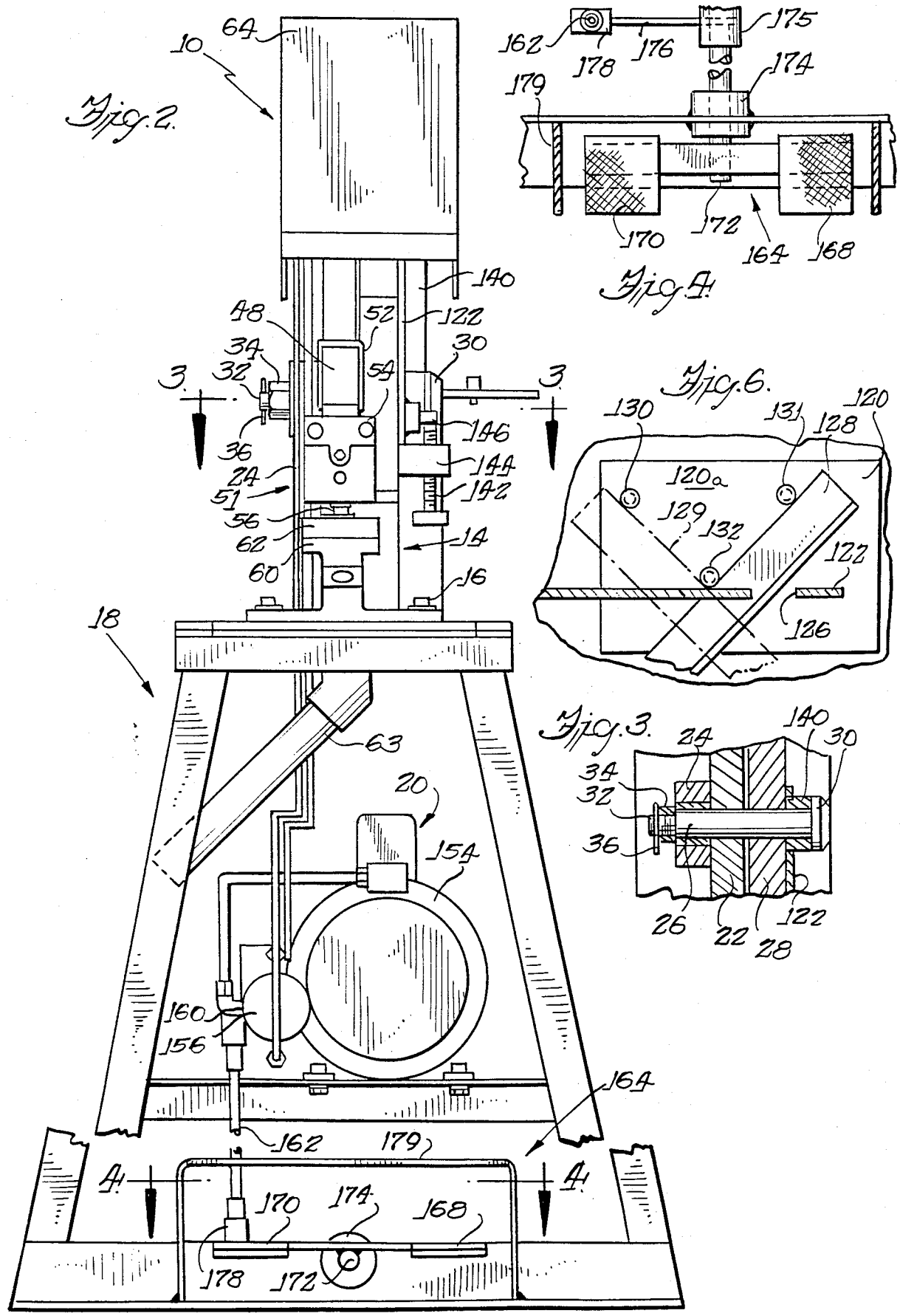

4,531,439

METAL WORKING APPARATUS

BACKGROUND OF THE INVENTION

This invention is directed generally to the metal working arts and more particularly to a novel metal working machine for alternatively performing one or more of a plurality of operations upon one or more metal workpieces.

Metal working machines for performing various punching, cutting and shearing operations are generally known. However, many such machines are capable of but a single operation at a time. Even with interchangeable tools, many such machines are large and expensive, and yet capable of performing but a single operation at a single work station. Hence, a metal fabricating plant may be required to employ a separate machine for each of a plurality of operations to be performed upon one or more metal workpieces.

Moreover, each machine employed requires at least one operator. Accordingly, where multiple metal working operations are to be performed by a corresponding plurality of machines, it has heretofore often been necessary to employ an individual skilled machinist to operate each of the machines.

It will be appreciated from the foregoing that considerable expense may be incurred, both in obtaining the plurality of machines necessary to perform a plurality of operations, and in employing the necessary workers to operate the machines.

OBJECTS AND SUMMARY OF THE INVENTION

Accordingly, it is a general object of the invention to provide a novel and improved metal working machine which substantially avoids many of the foregoing problems of the prior art.

A more specific object is to provide a metal working machine which is capable of providing two or more tools for alternatively performing two or more corresponding metal working operations.

A related object is to provide a machine in accordance with the foregoing objects which is adapted to alternatively perform either of at least two operations, under the control of but a single operator.

Briefly, and in accordance with the foregoing objects, a metal working apparatus in accordance with the invention comprises a fixed frame; first and second metal working tools; mounting means for operatively mounting said first and second tools to said frame; said mounting means being alternately movable in one of a first direction for operating said first tool and a second direction for operating said second tool; bi-directional drive means carried upon said frame for driving said mounting means in said first and second directions to respectively operate said first and second tools; and control means for respectively controlling the direction of operation of said drive means so as to drive the mounting means respectively in said first and second directions.

BRIEF DESCRIPTION OF THE DRAWINGS

The foregoing as well as other objects, features and advantages of the invention will be more readily appreciated upon reference to the following detailed description of the illustrated embodiment, together with reference to the drawings, wherein:

FIG. 2 is an end view of the machine of FIG. 1, taken generally in the plane of the line 2—2 of FIG. 1;

FIG. 3 is a partial sectional view taken generally in the plane of the line 3—3 of FIG. 2;

FIG. 4 is a partial sectional view taken generally in the plane of the line 4—4 of FIG. 3;

FIG. 6 is a partial sectional view taken generally in the plane of the line 6—6 of FIG. 5.

DETAILED DESCRIPTION OF THE ILLUSTRATED EMBODIMENT

Figure 1:
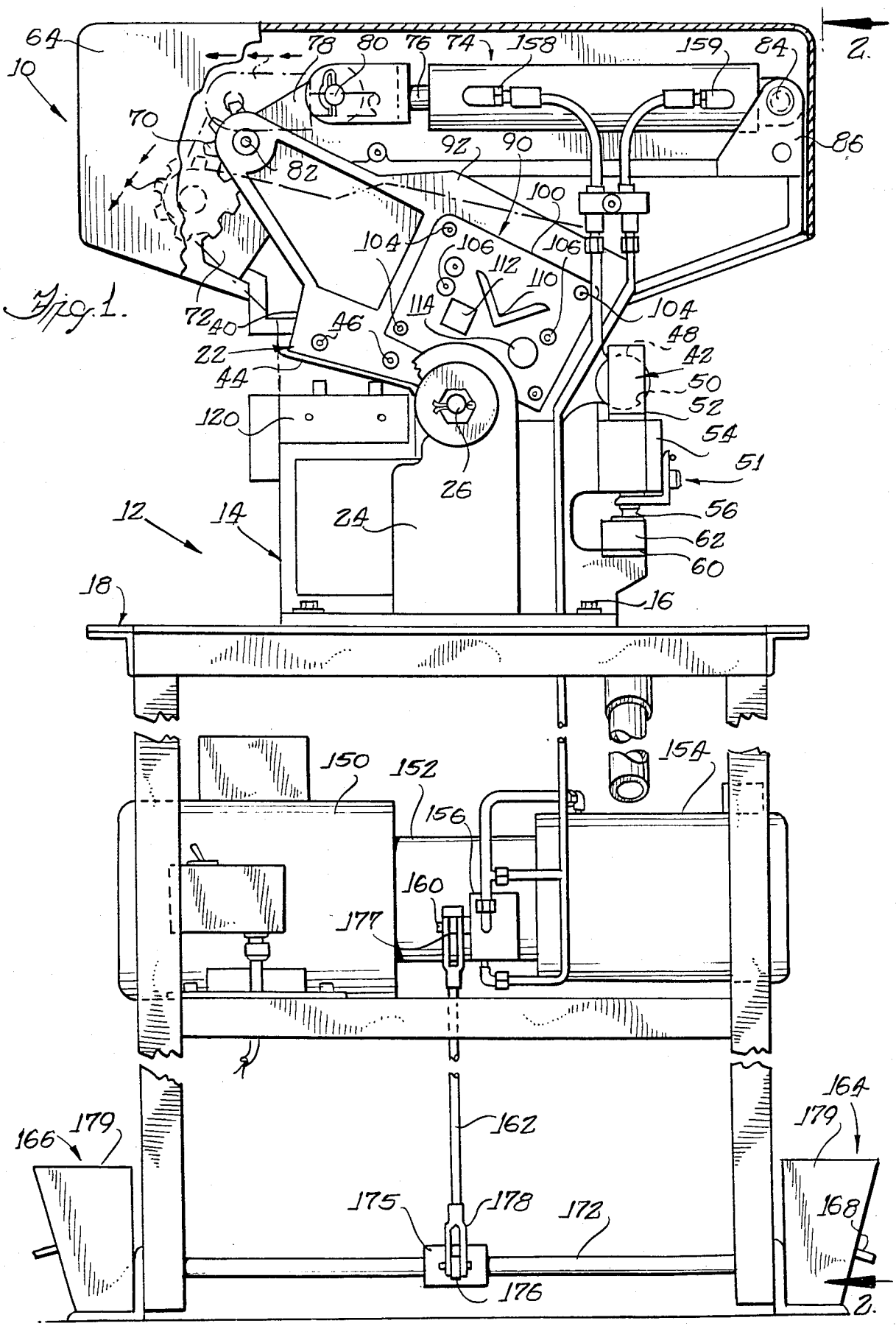
FIG. 1 is a side elevation, partially in section and partially broken away, of a metal working machine in accordance with the invention.

Referring now to the drawings and initially to FIG. 1 a metal working machine or apparatus in accordance with the invention is designated generally by the reference numeral 10. Preferably, the machine 10 is relatively compact and lightweight as compared to typical metal working machinery.

The machine 10 is mounted to a fixed framework designated generally 12 which includes a first fixed frame portion 14 which is securely bolted or otherwise mounted as indicated at 16 to a second frame portion or table 18. This table portion 18 preferably carries suitable power drive or energizing apparatus 20 for energizing the machine 10 so as to operate the tools carried thereupon.

In accordance with a feature of the invention, the fixed frame 14 pivotally mounts a movable frame member or arm 22. In this regard, the pivotal mounting is provided by a generally vertically extending arm or support portion 24 of the frame 14 which carries a shaft 26 at an upper portion thereof. Referring briefly to FIG. 3, it will be seen that the shaft 26 extends through suitable bearing surfaces respectively provided in the support arm 24, the movable frame member 22 and an opposite wall portion 28 of the fixed frame portion 14. In the illustrated embodiment, the shaft 26 is further provided with an enlarged head portion 30 at one end thereof and an externally threaded portion 32 at the other end thereof. This latter externally threaded portion 32 is further secured by a suitable mating internally threaded fastener or nut 34 as well as by a through cotter pin 36.

Referring again to FIG. 1, the movable frame member 22 advantageously extends generally laterally outwardly to either side of its pivotally mounting at shaft 26 to define respective tool mounting portions 40 and 42. The first tool mounting portion 40 receives a cutting tool or blade 44 removably mounted thereto by suitable means such as fasteners 46. The opposite tool mounting portion 42 comprises a ball member 48 which fits a complimentary socket portion 50 of a ram member 52 which forms part of a die punch assembly designated generally 51. In this regard, the ram 52 is mounted for slidable movement in a generally vertical direction in a sleeve 54, and mounts at its end opposite the ball 48 a suitable die or punch tool 56. Immediately below the tool 56, the fixed frame portion 14 includes an anvil or platform portion 60 which is configured to accept a die block 62 for complimentarily receiving the die or punch tool 56.

Additionally, the punch or die assembly is provided with a suitable waste material discharge chute 63 from the die block 62. Preferaby, this discharge chute 63 is pivotally mounted for directing the discharge material in a desired direction into a suitable container or the like.

Referring now to the upper part of the machine 10, a suitable exterior housing or casing 64 covers a portion of the the movable frame member 40 and an associated drive structure therefor. This casing 64 is partially broken away in FIGS. 1 and 5.

The movable frame member 40 will be remembered to be coupled by way of shaft 26 for pivotal movement with respect to the fixed frame portion 14. To this end, a laterally outer end of movable frame 40 is provided with a rotatably mounted pinion gear 70. Cooperatively, the fixed frame member 14 includes a complimentarily formed rack 72, along which the pinion gear 70 is movable.

The drive structure further includes a bi-directional or double acting hydraulic piston-and-cylinder assembly designated generally 74. A piston member 76 of assembly 74 is coupled by way of a suitable, relatively short link member 78 to the movable frame member 40. In this regard, one end of the link member 78 is pivotally coupled as indicated at 80 to an outer end of piston 76, while the other end thereof is rotatably coupled to the same pivot 82 which pivotally mounts pinion gear 70. Additionally, the piston and cylinder assembly 74 is preferably pivotally mounted at its opposite end, as indicated generally at 84, to a suitable mounting bracket 86 which is preferably rigidly coupled with the fixed frame portion 14.

In accordance with a preferred form of the invention a further metal working or metal forming portion or tool, designated generally by reference numeral 90, is also provided. This metal working portion or tool 90 is carried generally in an intermediate portion 92 of the movable frame member 22, that is, intermediate the ends 40 and 42 thereof which carry or mount the respective shearing or cutting blade 44 and die or punch assembly 51 previously described. In the illustrated embodiment, this intermediate tool or metal working portion 90 comprises a shear assembly, and is illustrated in section in FIG. 7, to which reference is next invited.

The shear assembly 90 generally comprises an apertured fixed shear plate 94 and a congruently apertured movable shear plate 96. The fixed shear plate 94 is coupled to the fixed frame 14 by suitable means such as a plurality of counter-sunk threaded fasteners 98. The movable shear plate 96 is coupled for movement in unison with the movable arm 22 by means of a suitable cover or carrier plate 100. In this regard, the cover plate 100 extends across a through opening 102 provided in the movable arm 22 for receiving the shear plate 96. Outer edges of the cover or carrier plate 100 are then coupled to the movable arm 22 by suitable threaded fasteners 104. Similar threaded fasteners 106 are utilized to couple the movable shear plate 96 with the cover or carrier plate 100.

Any number of shearing configurations may be provided, by the simple expedient of removal and replacement of the shear plates 94 and 96 and cover or carrier plate 100 just described. In the illustrated embodiment, these components are configured for alternatively shearing angle channel stock, square stock or cylindrical stock. In this regard, suitable aligned, congruent openings are provided in the respective cover or carrier plate 100 and respective movable and fixed shearing plates 96 and 94 for accommodating these three types of materials. These openings are indicated for example, in FIGS. 1 and 5 at 110, 112 and 114, respectively.

In the illustrated embodiment, the shear plates 94, 96 are configured and mounted so that the respective through openings are aligned when the apparatus 10 is in the position illustrated in FIG. 1. Accordingly, the shearing action of this tool 90 occurs in unison with the pivotal movement of the portion 40 of movable arm 22 toward a suitable table or anvil 120 for shearing or cutting by the blade 44 previously described.

Figure 5:
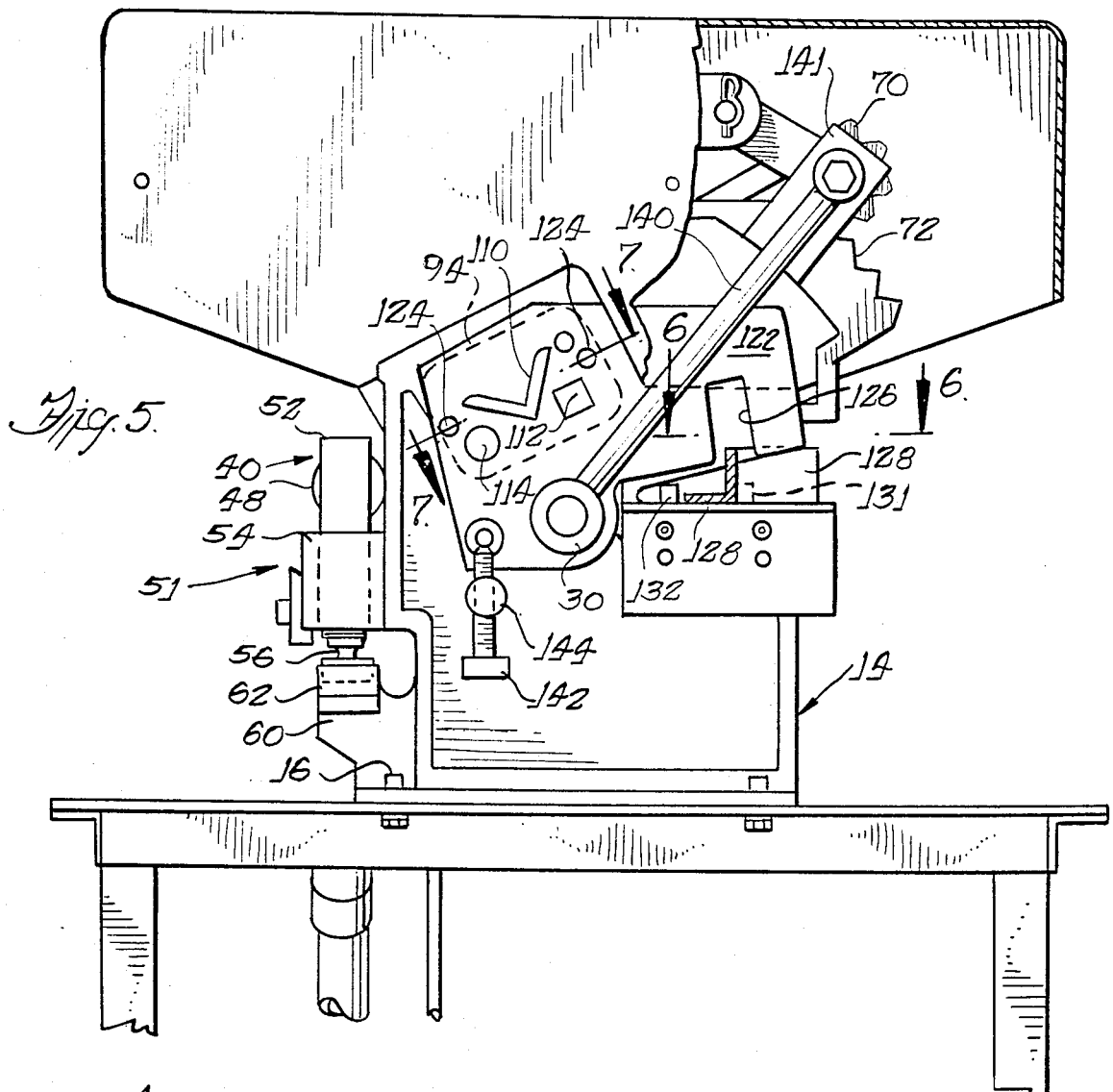
FIG. 5 is a partial side elevation taken from the side generally opposite that illustrated in FIG. 1.
Figure 7:
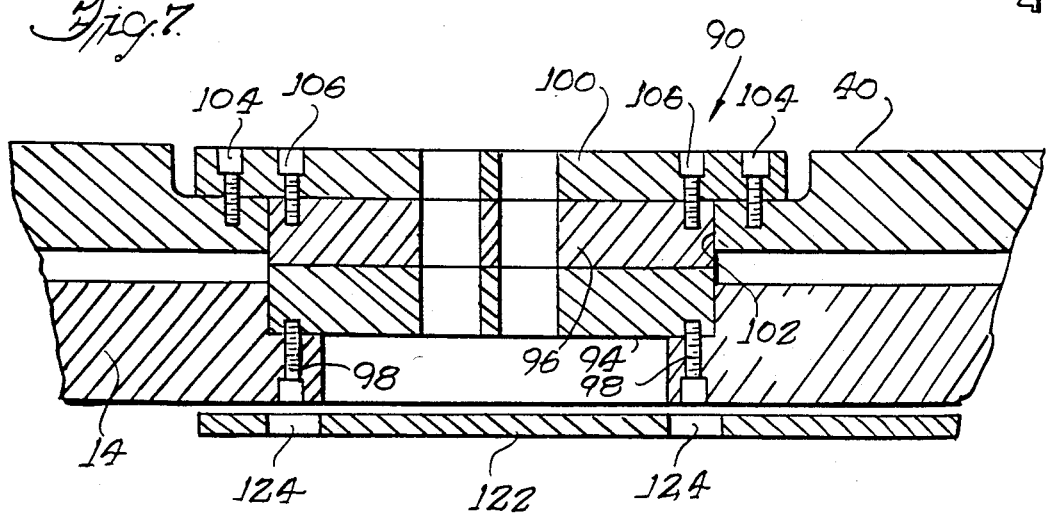
FIG. 7 is a partial sectional view taken generally in the plane of the line 7—7 of FIG. 5.

In this latter regard, reference is also invited to FIG. 5, wherein a pivotally movable hold down plate 122 is best viewed. This hold down plate 122 is configured to move in unison with the movable arm 22 in order to securely hold a work piece positioned upon the table or anvil 120 for shearing or cutting by the blade 44. In this regard, as also shown in FIG. 7, the hold down plate is provided with suitable through clearance apertures 124 for access to the fasteners 98 which hold the fixed shear plate 94 as described above.

Additionally, the hold down plate is provided with a suitable notch or cutout portion 126 for accommodating angle channel stock or material such as that indicated generally by reference numeral 128. Moreover, as best viewed in FIG. 6, a working surface 120a of table or anvil 120 is provided with suitably aligned guide bosses or pins 130, 131 and 132 to obtain a 45 degree mitered cut on the stock to be sheared by blade 44.

In this regard, FIG. 6 also illustrates the angle channel material 128 positioned for a 45 degree miter cut, such that the aperture or cutout 126 of hold down 122 accommodates the angle stock 128. On the other hand, a piece of flat stock 129 may be positioned away from cutout 126 as illustrated in phantom line.

An additional pivotally mounted elongate guide arm 140 and an associated guide plate 141 are also provided for guiding the pinion gear 70 with respect to the rack 72 at the side of the machine illustrated in FIG. 5. In this regard, the guide arm 140 is suitably pivotally mounted beneath the head portion 30 of shaft 26 as further illustrated in FIG. 3.

As best viewed in FIGS. 2 and 5, an adjustment screw or set screw 142 is provided for regulating the pivotal movement of the pivotally mounted assemblies thus far described in the direction of the die or punch tool assembly 51 previously described. This set screw or adjustment screw 142 is threadably advancable and retractable through a suitable boss 144 fixed to the side of the rigid frame member 14. The set screw or adjustment screw 142 is then adjustable with respect to an additional protruding boss or stop member 146 which is suitably affixed, as by welding, to a side portion of the hold down member 122. Preferably, the adjustment screw 142 is set in conjunction with the selection of the die or punch tool previously described.

As previously indicated, a suitable, preferably hydraulic, actuating or power drive assembly is provided for actuating the piston assembly 74. In this regard, the power components preferably include a suitable electric motor 150 which is coupled by suitable transmission or gear train 152 to a hydraulic pump 154. The hydraulic pump 154 is further coupled to the piston assembly 74 by way of a suitable directional control valve assembly 156. This control valve 156 controls the flow of hydraulic fluid from pump 154 to either of the two sides of the piston assembly 74 by way of suitable hydraulic lines and couplings indicated generally at 158 and 159.

The valve 156 is in turn controlled by a suitable mechanical control member or lever 160. That is, mechanical actuation or turning of the control member or lever 160 controls to which side 158 or 159 of the piston assembly 74 actuating hydraulic fluid as delivered by the valve 156.

In accordance with a feature of the invention, this control lever 160 is provided with a further elongate link or coupling rod 162 for operation from respective work stations comprising pedal assemblies 164 and 166 (see FIG. 1), which are located generally to opposite sides of the machine 10. In this regard, a first set of foot pedals 168 and 170 are pivotally mounted at work station 164. Advantageously, provision of the work stations or pedal assemblies 162 and 164 generally at opposite sides of the machine 10 permits alternative operation of the shear or cutting blade 44 (and shear tool 90), and of the die or punch tool 51. Hence, a single operator may alternatively control metal working by either of the tools provided on machine 10 by the simple expedient of standing at one of the two work stations and operating the associated foot pedals. In this regard, preferably the valve 156 and control lever 160 are arranged so that operation of the foot pedal at work station 164 operates the punch tool assembly 51 while operation of the opposite foot pedal at work station 166 operates the cutting blade 44 and shear assembly 90.

Referring now to FIGS. 2 and 4 in greater detail, it will be seen that the foot pedals 168 and 170 are mounted across one end of an elongate transverse bar 172 which is mounted pivotally to the table 18 at a bearing 174. It will be noted that the pedal assembly 166 is of substantially identical configuration and is similarly mounted at an opposite end of the transverse bar 172. This bar 172 mounts a suitable bracket 175 at its central portion which is provided with an elongate arm or lever 176, which is in turn pivotally coupled to a suitable yoke 178 which mounts the elongate rod 162. In this regard, a similar yoke and pivot arrangement 177 is also provided at the opposite end of the connecting rod 162 for coupling thereof to the control element or lever 160. Additionally, as best viewed in FIG. 1, each of the pedal assemblies 164 and 166 is provided with a suitable housing or hood member 179. In this regard, the respective housings or hoods 179 will be seen to be shaped so as to require operation of the control pedals from the left and right sides of the machine as viewed in FIG. 1. This substantially discourages operation of these foot pedals from the front and back sides of the machine, that is, those sides from which the view is taken in FIGS. 1 and 5.

While the invention has been illustrated and described herein with reference to a preferred embodiment, the invention is not limited thereto. Those skilled in the art may devise various changes, alternatives and modifications upon reading the foregoing descriptions. The invention includes such alternatives, changes and modifications insofar as they fall within the spirit and scope of the appended claims.

The invention is claimed as follows:

1. A metal working apparatus comprising: a fixed frame; first and second metal working tools; mounting means including a movable frame member and means for pivotally mounting said movable frame member to said fixed frame for operatively mounting said first and second tools to said fixed frame; said mounting means being pivotally movable alternatively in one of a first direction for operating said first tool and a second direction for operating said second tool; bi-directional drive means carried upon said fixed frame above said pivotal mounting means for driving said mounting means in said first and second directions; and operator accessible control means for respectively controlling the direction of operation of said drive means so as to drive the mounting means respectively in said first and second directions; wherein said drive means comprises dual acting piston means and rack and pinion means operatively coupling said piston means for pivoting said movable frame member bi-directionally with respect to said fixed frame.

2. Apparatus according to claim 1 wherein said control means comprise first and second controls located respectively at first and second work stations on opposite sides of said fixed frame.

3. Apparatus according to claim 1 and further including a third tool; said mounting means operatively mounting said third tool for operation in unison with one of said first and second tools.

4. Apparatus according to claim 3 where each of said first, second and third tools is removably mounted by said mounting means so as to be replaceable.

5. Apparatus according to claim 3 wherein said third tool comprises a shearing tool including a fixed shear plate coupled to said fixed frame and a movable shear plate mounted to said movable frame member; each of said fixed and movable shear plates having at least one aperture shaped congruently with a cross-section of a workpiece to be sheared thereby; said fixed and movable shear plates having the apertures therein aligned for receiving said workpiece therein when said mounting means is operated to one of said first and second directions; and said movable shear plate moving said aperture thereof in a shearing motion relative to the aperture of said fixed shear plate in response to movement of said mounting means in the other of said first and second directions.

6. Apparatus according to claim 1 wherein said movable frame member defines first and second portions extending respectively oppositely laterally outwardly of said pivotal mounting means, the first tool being coupled to said first portion and the second tool being coupled to said second portion.

7. Apparatus according to claim 6 and further including a third tool, said movable frame including an intermediate portion for carrying said third tool for operation in unison with one of said first and second tools.

8. Apparatus according to claim 7 wherein said third tool comprises a shearing tool and said first and second tools respectively comprise one of punching tools or cutting tools.

9. Apparatus according to claim 1 wherein said drive means further comprises pump means for energizing said piston means, and valve means intermediate said pump means and said piston means for controlling the direction of energization of said piston means; and wherein said control means comprises a pair of control members coupled for operating said valve means and located at opposite sides of said fixed frame for selective individual actuation by a single operator.

10. A metal working apparatus comprising: a fixed frame; first and second metal working tools; mounting means for pivotally mounting said first and second tools to said fixed frame; said mounting means defining a pivot and mounting the first and second tools to either side of said pivot for alternative operation; bi-directional drive means carried upon said fixed frame above said pivot for bi-directionally driving said mounting means about said pivot for alternatively operating said first and second tools; and control means for respectively controlling the direction of operation of said drive means so as to drive the mounting means respectively in said first and second directions; said control means including operator accessible first and second control elements located respectively at first and second work stations on opposite sides of said fixed frame; wherein said drive means comprises dual acting piston means and rack and pinion means operatively coupling said piston means for bi-directionally pivoting said movable frame member.

11. Apparatus according to claim 10 and further including pump means for energizing said piston means; and wherein said control means comprises valve means intermediate said pump means and said piston means for controlling the direction of energization of said piston means; said first and second operator accessible control elements being operatively coupled to said valve means.

12. Apparatus according to claim 10 wherein said mounting means includes a movable frame member mounted at said pivot to said fixed frame.

13. Apparatus according to claim 12 wherein said movable frame member defines first and second portions extending respectively oppositely laterally outwardly of said pivot; the first tool being coupled to said first portion and the second tool being coupled to said second portion.

14. Apparatus according to claim 13 and further including a third tool, said movable frame member including an intermediate portion for carrying said third tool for operation in unison with one of said first and second tools.

* * * * *